(12) United States Patent
Akins (10) Patent No.: US 7,218,311 B2
(45) Date of Patent: May 15, 2007

(54) SEQUENTIAL IMAGE ADVANCING SYSTEM (THE S.I.A.S.)

(76) Inventor: Randy D. Akins, P.O. Box 91680, Tucson, AZ (US) 85752

( * ) Notice: Subject to any disclaimer, the term of this patent is extended or adjusted under 35 U.S.C. 154(b) by 322 days.

(21) Appl. No.: 10/600,418

(22) Filed: Jun. 21, 2003

(65) Prior Publication Data
US 2004/0069117 A1     Apr. 15, 2004

(51) Int. Cl.
*G09G 5/00*     (2006.01)
*G10L 11/00*    (2006.01)
*G10L 15/00*    (2006.01)

(52) U.S. Cl. ................. 345/156; 704/235; 704/275
(58) Field of Classification Search ........ 345/156–158, 345/173, 901–905, 168–169, 184; 361/680, 361/681; 341/22, 23; 704/246, 235, 275
See application file for complete search history.

(56) References Cited

U.S. PATENT DOCUMENTS

| | | | |
|---|---|---|---|
| 4,779,510 A * | 10/1988 | Van den Abbeel | 84/464 R |
| 5,199,104 A * | 3/1993 | Hirayama | 715/776 |
| 5,209,665 A * | 5/1993 | Billings et al. | 434/169 |
| 5,239,665 A * | 8/1993 | Tsuchiya | 715/776 |
| 5,467,102 A * | 11/1995 | Kuno et al. | 345/1.3 |
| 5,475,399 A * | 12/1995 | Borsuk | 345/472 |
| 5,530,234 A * | 6/1996 | Loh et al. | 235/61 R |
| 5,534,888 A * | 7/1996 | Lebby et al. | 345/672 |
| 5,761,485 A * | 6/1998 | Munyan | 715/839 |
| 5,828,768 A * | 10/1998 | Eatwell et al. | 381/333 |
| 6,055,327 A * | 4/2000 | Aragon | 382/138 |
| 6,485,019 B1 * | 11/2002 | Braunlich et al. | 273/284 |
| 6,751,473 B1 * | 6/2004 | Goyal et al. | 455/556.1 |
| 6,766,332 B2 * | 7/2004 | Miyazaki et al. | 707/102 |
| 2002/0190947 A1 * | 12/2002 | Feinstein | 345/158 |
| 2003/0104850 A1 * | 6/2003 | Lai et al. | 455/575 |
| 2003/0165047 A1 * | 9/2003 | Eiden | 361/679 |
| 2004/0218732 A1 * | 11/2004 | Menard et al. | 379/45 |

* cited by examiner

*Primary Examiner*—Richard Hjerpe
*Assistant Examiner*—M. Fatahiyar (57) ABSTRACT

The present invention is a computerized image-viewing device that allows the user to sequentially advance or reverse stored images by voice recognition and/or other sounds wherein the voice recognition means is electronically coupled with different colored buttons located on the viewer wherein the buttons electronically illuminate by vocal, sound or computer switch input.

5 Claims, 4 Drawing Sheets

SEQUENTIAL IMAGE ADVANCING SYSTEM (THE S.I.A.S.)

BACKGROUND

1. Field of Invention

The present invention relates generally to computerized image-viewing devices and more particularly to a new system that allows the user to sequentially advance or reverse images by voice and/or sound recognition wherein different colored buttons electronically illuminate on voice or sound command.

2. Prior Art

The use of portable image-viewers, display-devices, music-readers and electronic books are known in the prior art. The idea of image advancing devices and/or page-turners has been an interest to many inventors.

The following patents represent related patent-documents that I have found through my patent search.

For example:

Rubincam, U.S. Pat. No. 4,159,417 Jun. 26, 1979

Rubincam's Electronic Book is described as a device using digital memory and display along with a storage container that presents digitally encoded information on a display screen. His invention uses holographic cards to store information.

Hatakeyama U.S. Pat. No. 4,757,302 Jul. 12, 1988

Hatakeyama et al, image-displaying apparatus presents a device for displaying a plurality of images.

The object of this apparatus was to provide easy and efficient searching of documents contained in microfilm or electronic files.

Van d.Abbeel U.S. Pat. No. 4,779,510 Oct. 25, 1988 Van den Abbeel describes an electronic apparatus for displaying music. This apparatus although cumbersome proposes a console having a screen for displaying electronically stored music for each musician of an orchestra. Accompanying the viewing screen is a keyboard for use by the user, and a microphone to pick up sounds emitted during the performance of a selection of music. As the performance proceeds, the musical score displayed on the screen is automatically shifted page by page.

Fernandez, U.S. Pat. No. 4,855,725 Aug. 8, 1989

Fernandez describes a microprocessor based simulated book based upon using a compact disk (CD-ROM), LCD screen and a connection to a mass storage PC. This device has the size and shape of a book and could possibly be bound in leather. The device is driven by the microprocessor and has a viewable screen. It has switches on a tactile pad similar to a track-ball and is used for scrolling through information on the screen. This Ebook has several pages of walk-away memory (about 20 pages) that can be used for later reading when not connected to the mass storage.

Tsuchiya U.S. Pat. No. 5,239,665 Aug. 24, 1993

Tsuchiya describes an Electronic Book that has special keys for changing pages and certain portions of text. This Ebook permits retrieval from laser cards and floppy disks. Here the user can read visual presentations of information at a speed at which the user can read books. Tsuchiya makes special mention of the importance of Ebooks for social reasons of saving space and saving the trees on planet earth.

Oliva, U.S. Pat. No. 5,438,344 Aug. 1, 1995

Oliva describes a portable video book for displaying information stored on a CD-ROM disk.

The goal here was to provide a simpler way to read a book by using the CD-ROM and video display. Designed to help children perhaps with poor eyesight, the display could change text sizes.

Van Kruistum, U.S. Pat. No. 5,703,624 Dec. 30, 1997

Van Kruistum describes a compact-portable image viewer for read-only files. A LCD screen is included along with a standard floppy disk drive to receive non-volatile floppy disks. After an image is displayed on the LCD screen the device allows the user to press a key to pan the image for magnification and for different viewing.

Reavey U.S. Pat. No. 5,847,698 Dec. 8, 1998

Reavey's Electronic Book Device combines the look and feel of a convention book along with electronic technology. This has a single flat panel or a dual flat panel display that accesses information on memory cards. The display screens can display text and graphics in black and white or in a color format. This Ebook has three different viewing modes on the viewing panels.

Gaston, U.S. Pat. No. 5,956,048 Sep. 21, 1999 Gaston describes and electronic book system that is ergonomically shaped with thumb-shaped frontal depressions for comfortable gripping. Control buttons are mounted for thumb manipulation. This apparatus is battery-powered and includes a memory, which receives text downloaded from a computer. This unit is equipped with a stand to help connectivity to the PC. The stand is modular with corresponding male and female data ports. Information can be stored on a ROM chip and plugged into the unit to view information. Gaston suggests that book publishers could offer books or novels with encoded onetime-accessing of the data to prevent unauthorized copying of the information.

Kuno et al. describes a portable display device capable of presenting a document in an easy to read format. This is accomplished by having at least two display screens and by providing the user with two modes. The first mode allows the screens to be linked together to view information and the second allows the user to view information on the screens independent of each other.

Froeber U.S. Pat. No. 5,991,594 Nov. 23, 1999

Froeber describes an electronic book using a LCD screen and PCMCIA cards. The apparatus also includes a pair of speakers, a speech processor/synthesizer and bookmark buttons.

MacMahon U.S. Pat. No. 6,037,954 Mar. 14, 2000

McMahon describes a portable hand-held reading device with improved ruggedness and usability features. Comprises a display screen, control panel and a memory device. Includes "bookmarking" and scrolling features forward and backward through a document. Text size can also be controlled. Removable memory is provided with CD-ROM or Micro CD-ROM. Shock-resiliency, easy-grip and impact absorption to protect the device is of keen interest.

Chombo U.S. Pat. No. 6,313,828 Nov. 6, 2001

Chombo's electronic book relates two LCD screen panels connected to each other with a hinge. Some of the functions include: PCMCIA slot, power supply, external device inputs, hard-drive, audio processor, video processor, RAM memory and processor along with a CD-ROM drive. Here, Chombo tries to merge peak technology from Personal Computers (PC) with an Ebook.

Eberhard U.S. Pat. No. 6,331,867 Dec. 18, 2001

Eberhard describes a user interface and other software features that facilitate viewing and the management of information by using touch-sensitive display screen. This is a hand-held computing device that is adapted to communicate with a PC via a "cradle".

Jacklin U.S. Pat. No. 6,396,472 May 28, 2002

Jacklin describes a device and process for displaying images and sound. Here, this device receives information from memory cards and non-volatile digital recording mediums (in miniature scale).

This apparatus also is a display for digital photographs with accompanying stored audio recordings.

Harada U.S. Pat. No. 6,486,890 Nov. 26, 2002

Harada, et al., describes a portable image device having an open display function like a book that displays electronic sheet information. The object of this invention was to provide the user with the option of viewing images on two screens or the same image on both screens. Selecting these modes is up to the user.

Kondo U.S. Pat. No. 6,512,497 Jan. 28, 2003 Kondo et al., describes an image information display device providing a two-screen (liquid crystal) electronic book that reduces energy consumption. Two screens may be used or the user can choose only one of the existing screens to conserve energy.

The foregoing prior art generally describes the various portable viewing devices and electronic books. There are many similarities with all of them. They all seem to have some kind of memory storage, portals for memory cards, digital cards, CD-ROM or floppy disks. Liquid crystal display (LCD screens) seems to be the choice of most electronic books and image viewers. Navigating through the various programs can be accomplished by pressing buttons, scrolling devices or touch-screen technology. However, it is the view of this inventor that there are individuals who find it difficult, inconvenient or impossible to reach an arm or hand to access the controls on any of these devices. There are those who are physically handicapped or challenged who would find little or no help from any of the devices or electronic books available. For individuals unable to move a hand, finger or foot, the inventions based upon the prior art would not allow those individuals to function in an independent manner.

OBJECTS AND SUMMARY OF THE INVENTION

In view of the above it is an object of the present invention to provide a (new and portable) computerized image-display-device and method to help individuals who find it difficult, inconvenient or impossible to turn a page or to push a button. Another object of the present invention is to include the appropriate buttons, switches and controls that will allow individuals who are able to manually navigate this present invention.

This invention differs and improves upon known prior art in several ways:

1. This invention is equipped for voice and/or sound recognition allowing the user to advance or reverse images and the printed page by voice command or other sounds wherein the sound recognition means are electronically coupled with different colored navigational buttons which electronically illuminate when activated by voice or sound command providing immediate verification that the vocal command has been received by the sound recognition means and display means.

BRIEF DESCRIPTION OF THE DRAWINGS

The unique features of the present invention should be better understood by viewing the following detailed-drawings set forth as a preferred embodiment of the invention for the purpose of illustration but not limiting the invention.

DETAILED DESCRIPTION OF THE PREFERRED EMBODIMENTS

Figure 1:
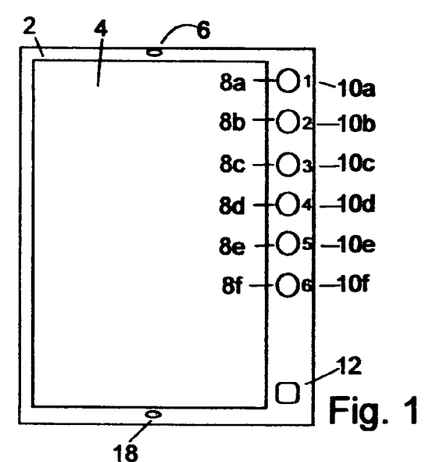
FIG. 1 illustrates the front perspective view of the single display screen according to an embodiment of the present invention.
Figure 2:
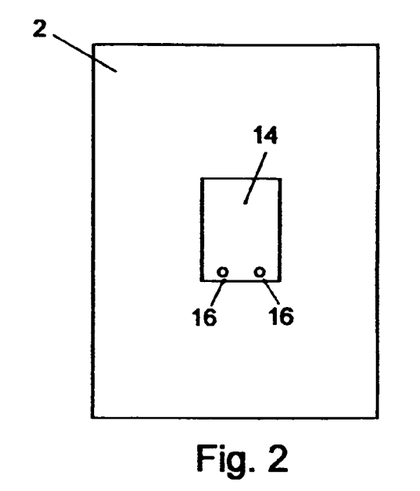
FIG. 2 illustrates the back perspective view of the single display screen according to the embodiment of the present invention.
Figure 3:
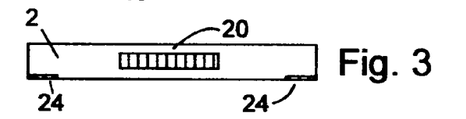
FIG. 3 illustrates the top view with carrying handle.
Figure 4:
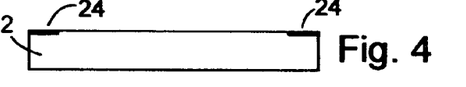
FIG. 4 illustrates the bottom view of the present invention.
Figure 5:
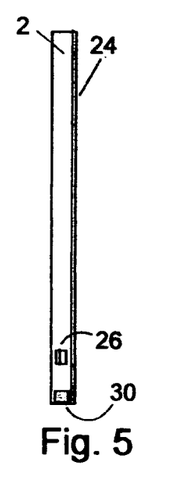
FIG. 5 illustrates the left-side view with on and off switch.
Figure 6:
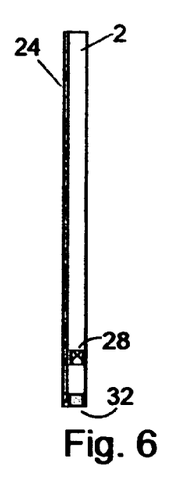
FIG. 6 illustrates the right-side view with the input for the electric supply cord.
Figure 7:
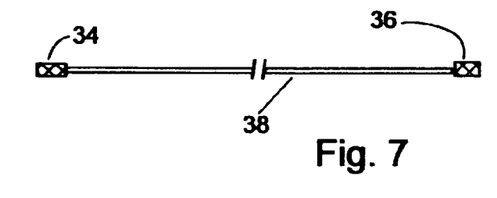
FIG. 7 Illustrates the power cord that carries power and electronic signals to and from the display screen from the computer box.
Figure 8:
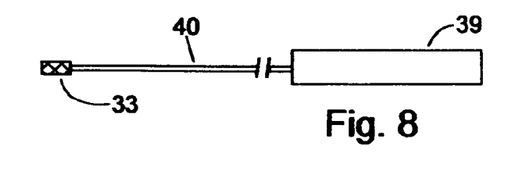
FIG. 8 illustrates a rechargeable battery pack equipped to interface with the display unit.
Figure 9:
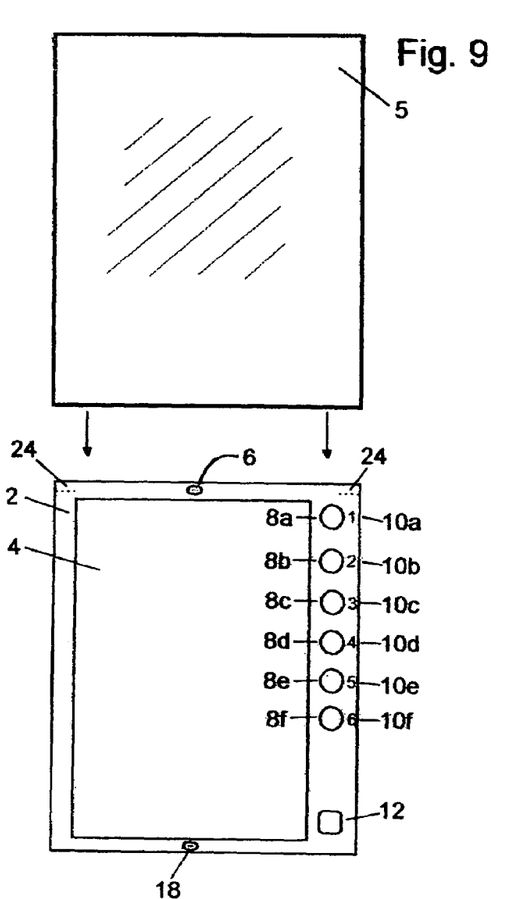
FIG. 9 illustrates a slide-on protective covering for the single display screen
Figure 10:
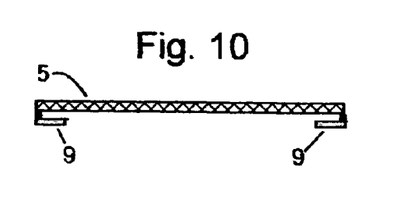
FIG. 10 illustrates the top view of the slide-on protective covering.
Figure 11:
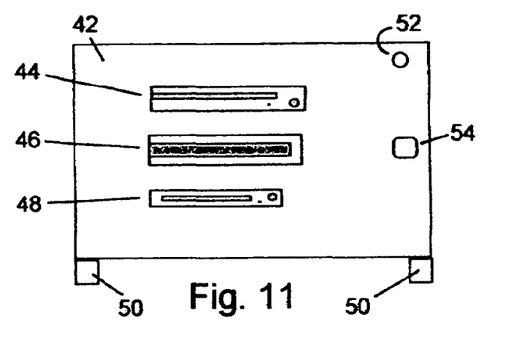
FIG. 11 illustrates the front perspective view of the computer box.
Figure 12:
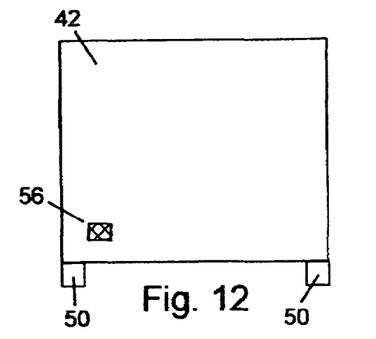
FIG. 12 illustrates the left-end view of the computer box.
Figure 13:
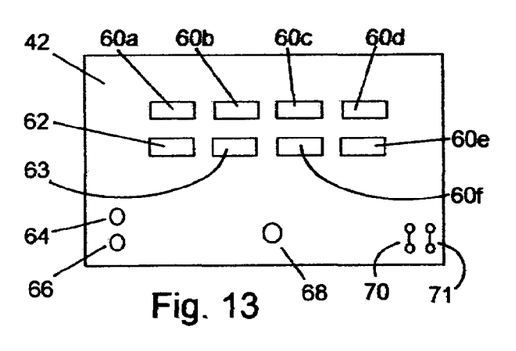
FIG. 13 illustrates the back perspective view of the computer box.
Figure 14:
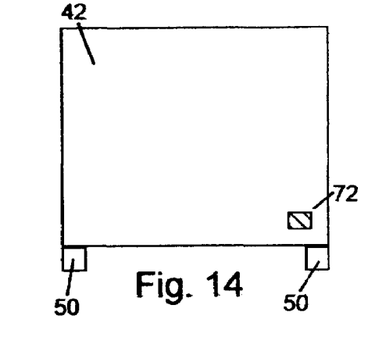
FIG. 14 illustrates the right-end view of the computer box.
Figure 15:
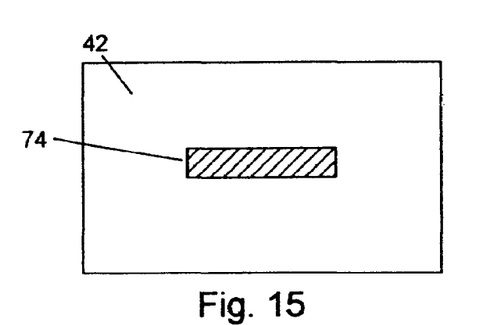
FIG. 15 illustrates the top perspective view of the computer box.
Figure 16:
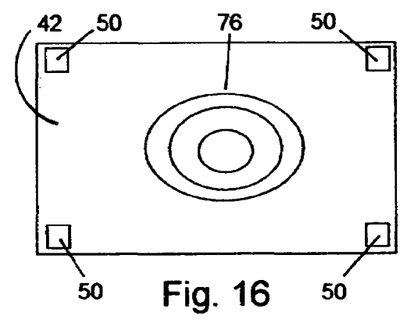
FIG. 16 illustrates the bottom perspective view of the computer box.
Figure 17:
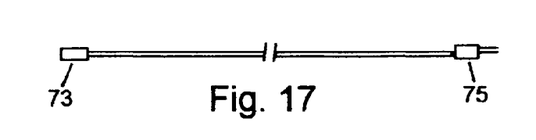
FIG. 17 illustrates the electric power wire connecting household current to the computer box.
Figure 18:
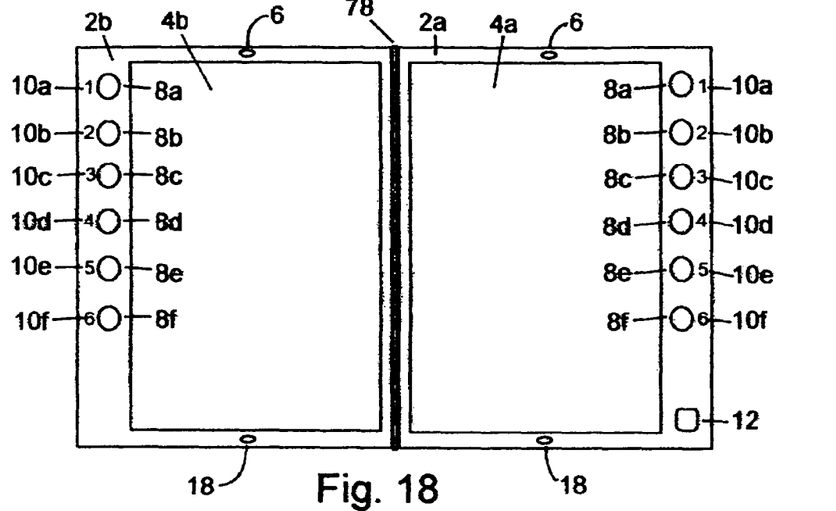
FIG. 18 illustrates a double display screen with hinge.
Figure 19:
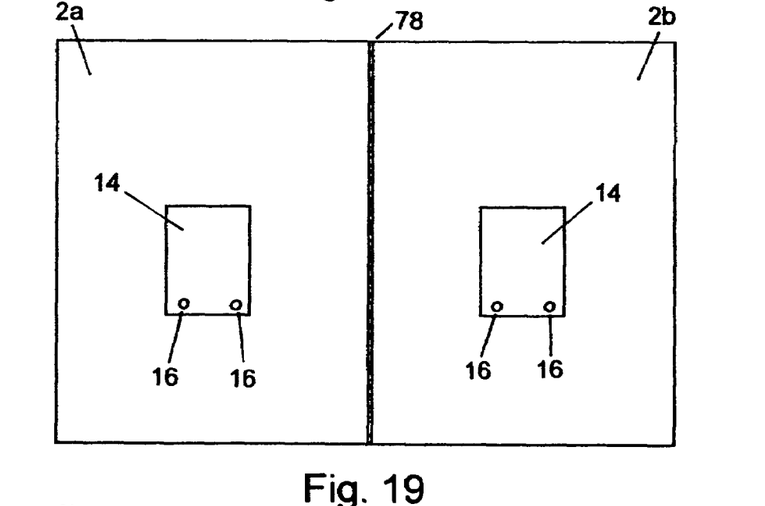
FIG. 19 illustrates the back view of the double display screen.
Figure 20:
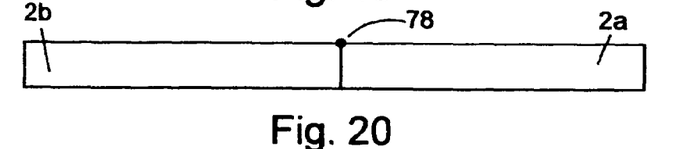
FIG. 20 illustrates the top view of the double display screen.
Figure 21:
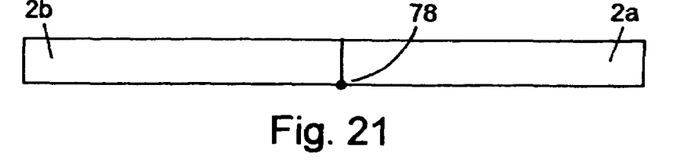
FIG. 21 illustrates the bottom view of the double display screen.

Now referring to FIG. 1–FIG. 21, the embodiment of a new computerized image-viewing device and method according to the present invention will be described in detail. In FIG. 1 there is a viewing display unit adapted-to-be-used as a portable image-viewing device. A LCD (or Plasma-related) viewing screen 4, is surrounded by a durable (light-weight-poly-plastic) housing 2 that protects the display screen and houses a electronic wiring system (not shown) and a credit card "size"—computer on a chip (not shown). In this front view of the apparatus can be seen several unique details regarding this new image-display device. An infrared sensor 6 at the top of the display screen allows a user to navigate through the programs of the display unit by a remote control. A voice recognition sensor 18 (located at the bottom of the display unit where the sensor will be closer to the user's voice) allows the user to navigate through the device's many functions by use of the human voice and/or other sounds. Different colored navigational buttons 8a–8f descends on the right-hand side of the housing along with a number 10a–10f for each of the different colored navigational buttons. The colored buttons and numbers will help the user navigate through the different programs to be displayed on the device. Another role of the numbers next to the colored-buttons is to help those who have a difficulty distinguishing colors. An auto-run button 12 will also be used for engaging the computer for specific tasks. By using the auto-run function, the user can program the computer to present images on the display screen in a sequential order by using the programs timer function. In FIG. 2 can be seen the back view of the display housing 2. There is a door 14 and two fasteners 16 for entrance into the interior of the housing. This is where the wiring and computer-on-a-chip is located. In FIG. 3 the top view of the housing 2 is illustrated. There is a carrying handle 20 that can be used to carry the display unit 2. This handle 20 collapses into the housing 2 to create an even finish. References 24 can be seen from the top view and refer to a guide-track that will allow the user to slide a cover 5 (FIG. 9) over the display screen 4. FIG. 4 illustrates the bottom view of the display housing 2 along with the guide-tracks 24 for the display cover 5. The left-side view of the display 2 is presented in FIG. 5. Again, the guide-tracks are illustrated in 24 for the front cover 5 and 26 illustrates an on/off switch. An input 30 is provided for a rechargeable battery source (see FIG. 8) and household electrical current. In FIG. 6, there is an input 28 for an electric wire that allows electric signals to be brought to and from the display unit and another input 32 for the rechargeable battery source to provide electricity (see FIG. 8). In FIG. 7, are two ends to the electric wire 38 where a male plug 34 attaches to reference 28 and the other end 36 attaches to the computer-box FIG. 12, reference 56. FIG. 8 illustrates the rechargeable battery pack 39, electrical wire 40 and a male plug 33 which interfaces with the left side of the display 2 at 30 or the right side of display 2 at 32. FIG. 9 illustrates the slide-on cover 5 for the LCD or plasma-related display screen reference 2 and 4. As can be seen by the arrows below the cover 5, the cover slides down into the guide-tracks 24 to cover the entire front of the display screen 4. The guide-tracks 24 stop at the bottom of the display housing 2 to prevent the cover from sliding out of the bottom of the unit 2. FIG. 10 illustrates a top view revealing the clips 9 that keep the cover 5 in place along the guide-tracks 24. FIG. 11 through FIG. 16 illustrates the computer box 42. In FIG. 11, a front-view of the computer box 42 presents the various hardware that help make this box a computer. This illustration makes room for both the CD-ROM drive 44 and the new and improved DVDR drive 46 which eventually could replace the CD-ROM drive 44 in computer use. A standard floppy drive 48 is included since the floppy drives are still being used. Through these drives (44, 46 and 48) information and images can be sent to the storage drive (not shown) in the computer box 42, stored in the computer-on-a-chip housed in FIG. 2 reference 14 and/or displayed on the display screen 4. Information can also be "written to" and stored on the CD-ROM, DVDR, and the floppy disks. It is considered in this present invention that there will be new hardware developed that are smaller in size and faster in production speed. This invention does not limit hardware to the present but allows for faster and smaller units of the future as well as current technology. The glow light is referenced at 52 alerting when the unit is turned on or off. The manual on-off switch is referenced at 54. FIG. 12 illustrates the left-end view of the computer box. The electric wire 38 mentioned in FIG. 7 connects reference 36 to the computer box at 56. Reference 34 mentioned in FIG. 7 connects to the display housing at 28 in FIG. 6. It is through this wire that the computerized information and images are sent to and from the display screen and the computer box. In FIG. 13, the U.S.B. ports and other ports are illustrated on the back view of the computer box where 60a–60f represents the U.S.B. ports. Peripheral devices such as media readers, scanners, links to other computer boxes, flash drives or thumb-drives and digital cameras can be plugged into these U.S.B. ports. Ports 62 and 63 represent Ethernet ports. A computer mouse connects at 64 and a computer keyboard can be connected at reference 66. Having some musical functions, port 68 allows a midi-musical instrument or device to be interfaced. Audio-in jacks are illustrated in FIG. 13 at reference number 70. Audio-out jacks are illustrated at 71. FIG. 14 details the right-side view illustrating the input 72 for a common household electricity wire or the rechargeable battery in FIG. 8, reference 39. The common electric plug is illustrated in FIG. 17 where 73 interfaces with 72(30 and 32) and 75 plugs into common household current. The top of the computer box 42 is represented in FIG. 15 showing a retractable carrying handle 74 for the unit. FIG. 16 represents the bottom of the computer box 42, illustrating the four rubber feet 50, and a vent 76 for the cooling fan (not shown). In FIG. 18 is an illustration of a twin screen or dual screen representation of this invention. FIG. 18 represents a front view. The display screen 4a is identical to reference 4 in FIG. 1 above. On the left-hand side of FIG. 18 is display screen 4b being the same kind of display screen as 4a with the colored buttons (8a though 8f) on the left-hand side instead of the right-hand side of the housing. References 10a–10f are identical on the left side. The housing 2a is the same as reference 2 in FIG. 1. Exception is made here on the left side-view (see FIG. 5) where there is a connecting piano hinge 78 that connects the twin screens together FIG. 18. Reference 2b, is the same kind of housing as 2a. The left side-view of 2b is identical to FIG. 5, which is moved to the left side of 2b in order to accommodate the center piano hinge 78 in FIG. 18. At the top of FIG. 18 are two infrared sensors 6 for remote image advancing and reversing. At the bottom of FIG. 18 are voice recognition sensors to allow the user to navigate by voice and/or sound commands. The auto-run button stated above (see FIG. 1) is located on the front housing 2a at reference 12. FIG. 19 represents the back view of the dual screen having identical doors 14 for access into the on-board computer and wiring. Fasteners 16 attach the doors. FIG. 20 illustrates the simple top view of the dual screen display with piano hinge 78 and FIG. 21 illustrates the bottom view of the dual screen display with piano hinge 78.

Operation of Invention

There are several ways to use the sequential image advancing system (the present invention). Once the computer box is connected to the display screen (FIG. 7), the user can access information and images from the CD-ROM drive, the DVDR drive, the floppy-drive and the internal memory of the computer box. "Images" refer to pictures, art, the printed page, signs, shapes, symbols, written and/or printed languages, drawings, and schematics, graphs, music symbols and digital images (both color and black and white). These images can be transferred in a sequential file order and stored in the computer memory means within the viewer system. Today, it is common knowledge that individuals can find and purchase information stored on storage devices like memory cards and CD-ROM. The user can simply insert a CD-ROM or other storage device into the computer box (FIG. 11) transfer and store those images to the memory means in the viewer and access the information on the display screen (FIG. 1). To navigate through the information or software presentations on the display screen 4, the user can advance images by voice recognition electronically coupled with the different colored buttons for immediate verification that the viewer's computer means has received input. Other ways to navigate on the present invention is to use the colored buttons on the housing of the display unit (8a–8f). These different-colored-buttons allow the user to navigate through the programs of editing/selecting and the image advancing and reversing process. The buttons can be polished plastic buttons, soft rubber buttons or computer generated buttons displayed on the led screen which illuminate when activated by vocal command or touch. The user can activate these buttons by voice command, sounds, touch or switch. The computer can also activate and light the buttons through it's own programs. The top button is Red 8a. Below the Red button is a Yellow button 8b. Next and below the Yellow button is a Blue button 8c. These three buttons represent the primary colors in art. Next, and below the Blue button are the three secondary colors: Orange 8d, Purple 8e and Green 8f. For individuals who can physically reach their hand, the buttons will prove to be very useful for navigating through the present invention capabilities. The different colored buttons are very significant regarding navigating and educational selections. Other added features are the numbers printed next to each of the colored-buttons. Next to the Red button will be the number "1" reference 10a. Next to the Yellow button will be the number "2" reference 10b. Next to the Blue button will be the number "3" reference 10c. Next to the Orange button will be the number "4" reference 10d. Next to the Purple button will be the number "5" reference 10e. Next to the Green button will be the number "6" reference 10f. Along with other functions that will help the user, the numbers will also help those individuals who have difficulty recognizing colors. For those who find it difficult, inconvenient or impossible to physically reach and touch the navigational buttons, they can simply "speak" the colors or numbers next to the colored buttons to navigate. An example of using the colored buttons would be to press the Red button 8a (or say "Red"), to "Stop" a process. If the user wants to start a process, the user will press or say "Green" 8f. To slow a process, the user might press the "Yellow" button 8b or say yellow.

Along with the above, this invention also has the technology for a user to simply touch the display screen in order to navigate through programs. This is known by many as "touch-screen capabilities". The touch-screen capabilities are also electronically coupled to the colored-buttons that illuminate once the viewing screen has been touched.

The present invention is also equipped to receive the different switches available for single or double-click input through the mouse port FIG. 13, reference 64. These switches are similar to a common computer mouse where a user can select a function by "clicking" the index finger mouse button and select again by "clicking" the right mouse button. These important switches would include any of the "puff and sip" devices that can be used by people who may not have the use of their arms or feet. Musicians might prefer a foot switch if they are performing alone. Other musicians who require an assistant to help advance or turn-pages might prefer an assistant to use a hand-held switch or a remote switch to advance each image of sheet music on the present invention's display screen. Regardless of the input device or function the different colored buttons illuminate upon input to verify that input has been received by the viewer computer and display means.

One of the major differences between the present invention and the prior art is that the present invention allows individuals to create and view images for themselves. By using a scanner or a digital camera the user can scan or download images into the viewer's computer memory means. The user will be able to arrange, sequentially order and edit the images that are scanned into the memory. Digital memory and cameras provide an excellent source to store images. The user can take digital pictures and arrange them in a specific order. This would include taking digital images of printed material, musical scores or anything else the user would like. If the user would prefer, the user may choose to use a personal computer to perform scanning or the transferring of digital images to the viewer's memory means, floppy, CD-ROM or DVDR.

What is claimed is:

1. A computerized image-viewer system for retrieving and displaying stored images and a printed page, comprising:
   a computer and computer memory for sequentially storing images and the printed page in a memory means;
   said computer's central processing means converting the images and printed page into a sequential file system;
   said computer for retrieval of said sequential files from said memory and display control means for sequentially displaying selected files on a viewer screen;
   voice recognition means for sequentially and individually advancing or reversing said displayed selected files by voice command wherein said voice recognition means is electronically coupled wit different colored buttons located on said image viewer-system wherein the buttons individually and electronically illuminate when a button's specific color is spoken and received by said voice recognition means and said computer to verify voice input and confirm navigation of said computer's display control means on said image viewer-system.

2. The system as claimed in claim 1 further comprising:
   said voice recognition means for sequentially and individually advancing or reversing said displayed selected files by voice command wherein said voice recognition means is electronically coupled with different colored buttons located on said image viewer-system wherein each colored button has a specific number associated to each of the colored buttons located on said image viewer-system and will individually and electronically illuminate the colored button associated with the specific number when a colored button's specific associated number is spoken and received by said voice recognition means and said computer to verify voice input and confirm navigation of said computer's display control means on said image viewer-system.

3. The system as claimed in claim 1 further comprising:
   a method wherein said voice recognition means electronically coupled wit said colored buttons provides navigation through said computer's processing and display control means wherein visual prompts in the form of questions on said viewer screen are responded to by vocal command of a particular button's color or a particular button's associated number for a particular task wherein said colored buttons individually and electronically illuminate to verify input and navigation in response to a specific question presented on said image-viewer system and completes a process or function required by said computer's processing and display control means.

4. The system as claimed in claim 1, further comprising:
   a method wherein each colored button on said image-viewer system is linked to a selected set of images to be displayed in sequential order;
   wherein the first colored button is linked to a first set of images or printed pages where first said button remains electronically illuminated throughout the display and presentation of said first set of images;

the next or second colored button is linked to a second set of images or printed pages where second said button remains electronically illuminated throughout the display of said second set of images;

the next or third colored button which is linked to a third set of images or printed pages where third said button remains electronically illuminated throughout the presentation of said third set of images;

the next or fourth colored button is linked to a fourth set of images or printed pages where fourth said button remains electronically illuminated throughout the presentation of said fourth set of images;

the next or fifth colored button is linked to a fifth set of images or printed pages where fifth said button remains electronically illuminated throughout the presentation of said fifth set of images;

the next or sixth colored button is linked to a sixth set of images or printed pages where sixth said button remains electronically illuminated throughout the presentation of said sixth set of images.

5. The system as set forth in claim 4, wherein the presentation of first, second, third, fourth, fifth and sixth said sets of images or printed pages can be repeated with new sets of images or printed pages as often as needed.

* * * * *

UNITED STATES PATENT AND TRADEMARK OFFICE
CERTIFICATE OF CORRECTION

| | | |
|---|---|---|
| PATENT NO. | : 7,218,311 B2 | Page 1 of 1 |
| APPLICATION NO. | : 10/600418 | |
| DATED | : May 15, 2007 | |
| INVENTOR(S) | : Randy D. Akins | |

It is certified that error appears in the above-identified patent and that said Letters Patent is hereby corrected as shown below:

On the title page, insert the following: --(63) This application claims benefit of provisional application Ser. No. 60/390,749 filed Jun. 21, 2002.--

In column 7, line 9 delete "led" and insert therefor -- "lcd"--.

Signed and Sealed this

Twenty-first Day of August, 2007

JON W. DUDAS
*Director of the United States Patent and Trademark Office*